(12) United States Patent
Okada et al.

(10) Patent No.: US 8,033,148 B2
(45) Date of Patent: Oct. 11, 2011

(54) ELECTRIC STEERING LOCK APPARATUS

(75) Inventors: Takahiro Okada, Kanagawa-ken (JP);
Kenjirou Hayashi, Kanagawa-ken (JP);
Ryuichi Yoshida, Kanagawa-ken (JP)

(73) Assignees: Alpha Corporation, Yokohama-Shi (JP);
Nissan Motor Co., Ltd., Yokohama-Shi (JP)

( * ) Notice: Subject to any disclaimer, the term of this patent is extended or adjusted under 35 U.S.C. 154(b) by 268 days.

(21) Appl. No.: 12/312,249

(22) PCT Filed: Nov. 8, 2007

(86) PCT No.: PCT/JP2007/071688
§ 371 (c)(1),
(2), (4) Date: May 1, 2009

(87) PCT Pub. No.: WO2008/056727
PCT Pub. Date: May 15, 2008

(65) Prior Publication Data
US 2009/0266122 A1    Oct. 29, 2009

(30) Foreign Application Priority Data
Nov. 10, 2006    (JP) .................................. 2006-305371

(51) Int. Cl.
*B60R 25/02*    (2006.01)
(52) U.S. Cl. .......................................... 70/186; 70/252
(58) Field of Classification Search ............ 70/182–186, 70/252
See application file for complete search history.

(56) References Cited

U.S. PATENT DOCUMENTS
5,554,891 A * 9/1996 Shimizu et al. .............. 307/10.2
(Continued)

FOREIGN PATENT DOCUMENTS
GB    2257676 A  *  1/1993
(Continued)

OTHER PUBLICATIONS
Extended European Search Report issued on Mar. 2, 2011 in the counterpart Application No. 07831419.2, four (4) pages.

*Primary Examiner* — Suzanne Barrett
(74) *Attorney, Agent, or Firm* — The Nath Law Group; Jerald L. Meyer; Sung Yeop Chung

(57) ABSTRACT

A rod guide portion (5) is protruded on a frame body (4), and a lock rod (10) is disposed in the rod guide portion (5) so as to be freely movable between a locked position and an unlocked position. A guide-side weak portion (13) and a rod-side weak portion (14) are provided on the rod guide portion (5) and the lock rod (10), respectively. A deadlock mechanism (15A) is provided, which locks a tip end side of the lock rod (10), the tip end side being cut off at the rod-side weak portion (14), at a position at a point of time when the lock rod (10) is cut off when the rod guide portion (5) and the lock rod (10) are cut off at positions of the guide-side weak portion (13) and the rod-side guide portion (14). A lock position holding device (30) is provided, which does not move an upper rod portion (10a) located closer to a base end side of the lock rod (10) than the rod-side weak portion (14) thereof to the unlocked position when the rod guide portion (5) and the lock rod (10) are cut off at the guide-side weak portion (13) and the rod-side weak portion (14).

8 Claims, 13 Drawing Sheets

U.S. PATENT DOCUMENTS

| | | | | |
|---|---|---|---|---|
| 6,295,848 B1* | 10/2001 | Suzuki | | 70/186 |
| 6,349,579 B1* | 2/2002 | Canard | | 70/186 |
| 6,354,117 B1* | 3/2002 | Canard | | 70/186 |
| 6,354,118 B1* | 3/2002 | Frick et al. | | 70/186 |
| 6,439,011 B1* | 8/2002 | Frick et al. | | 70/185 |
| 6,516,640 B2* | 2/2003 | Jacobs et al. | | 70/186 |
| 6,915,671 B2* | 7/2005 | Zillmann | | 70/186 |
| 7,007,525 B2* | 3/2006 | Okuno et al. | | 70/186 |
| 7,055,351 B2* | 6/2006 | Suzuki et al. | | 70/186 |
| 7,104,097 B2* | 9/2006 | Zillmann | | 70/186 |
| 7,121,126 B2* | 10/2006 | Zillmann | | 70/186 |
| 7,604,254 B2* | 10/2009 | Pieronczyk et al. | | 280/775 |
| 7,703,309 B2* | 4/2010 | Okuno et al. | | 70/186 |
| 7,810,363 B2* | 10/2010 | Okada et al. | | 70/186 |
| 7,823,426 B2* | 11/2010 | Okuno et al. | | 70/186 |
| 2004/0182121 A1* | 9/2004 | Fukatsu et al. | | 70/186 |
| 2005/0166650 A1* | 8/2005 | Shimura et al. | | 70/252 |
| 2006/0005588 A1* | 1/2006 | Okuno | | 70/186 |
| 2009/0266122 A1* | 10/2009 | Okada et al. | | 70/252 |
| 2010/0064742 A1* | 3/2010 | Okada et al. | | 70/185 |
| 2010/0083716 A1* | 4/2010 | Fukatsu et al. | | 70/186 |
| 2010/0192649 A1* | 8/2010 | Nakamoto | | 70/353 |

FOREIGN PATENT DOCUMENTS

| | | |
|---|---|---|
| JP | 07-101313 A | 4/1995 |
| JP | 09-256709 A | 9/1997 |
| JP | 10-264770 A | 10/1998 |
| JP | 11-310104 A | 11/1999 |
| JP | 2004-231122 A | 8/2004 |
| JP | 2004-314965 A | 11/2004 |
| JP | 2006-232136 A | 9/2006 |

* cited by examiner

ELECTRIC STEERING LOCK APPARATUS

This is an National Phase Application filed under 35 U.S.C. 371 as a national stage of PCT/JP2007/071688, with the filing date of Nov. 8, 2007, an application claiming the benefit of Japanese Patent Application No. 2006-305371, filed on Nov. 10, 2006, the entire content of each of which is hereby incorporated by reference in its entirety.

TECHNICAL FIELD

The present invention relates to an electric steering lock apparatus that is mounted on an automobile or the like and includes a so-called deadlock mechanism.

BACKGROUND ART

As this type of a conventional electric steering lock apparatus, there is one disclosed in Patent Document 1. As shown in FIG. 1 and FIG. 2, this electric steering lock apparatus 100 includes a frame 101 and a cover (not shown) that covers an upper surface of this frame 101. The frame 101 includes a frame body 102 and a rod guide portion 103 protruded from this frame body 102.

On an upper surface of the frame body 102 covered with the cover, there are housed: a drive motor (not shown) controlled by an operation for an ignition key cylinder by a person who carries an electronic key; a cam member (not shown) that rotates by drive of this drive motor; and the like. In the rod guide portion 103, a lock rod 105 in which an upper end side protrudes on the frame body 102 is housed so as to be freely movable. This lock rod 105 is composed of an upper rod portion 105a and a lower rod portion 105b coupled thereto, and moves, by the rotation of the above-described cam member (not shown), to a locked position (position of FIG. 1) where rotation of a steering shaft 110 is inhibited and to an unlocked position (position of FIG. 2) where the rotation of the steering shaft 110 is permitted.

On a base end spot of the rod guide portion 103 and a middle spot of the upper rod portion 105a of the lock rod 105, weak portions 106 and 107 thinner in thickness than other spots are provided.

A deadlock mechanism 120 includes: a lock pin 121 housed at a lower position than the weak portion 106 of the rod guide portion 103; a first spring 122 that urges the lock pin 121 in a protruding portion; a lock control member 123 that regulates movement of the lock pin 121 in the protruding direction; a second spring 124 that urges the lock control member 123 upward; a frame body 102-side stopper 125 that regulates upward movement of the lock control member 123; and first and second engagement grooves 126 and 127 formed on the upper rod portion 105a.

In the above-described configuration, when the person who carries the electronic key turns the ignition key cylinder from an OFF position to an ON position in order to run a vehicle, the lock rod 105 moves by the drive of the drive motor (not shown), and the electric steering lock apparatus 100 turns from a steering locked state of FIG. 1 to a steering unlocked state of FIG. 2. Thereafter, when an ignition key is rotated to an engine start position, an engine is started. When an impact with a predetermined value or more is applied to the rod guide portion 103 and the lock rod 105 as a result of that the vehicle radically slows down during the running thereof and the knees of a driver collide with the electric steering lock apparatus 100 in this case, the rod guide portion 103 and the lock rod 105 are cut off at the spots of the weak portions 106 and 107, whereby an impact received by the driver is reduced.

Then, when the rod guide portion 103 and the lock rod 105 are cut off at the weak portions 106 and 107, as shown in FIG. 3, the lock control member 123 moves upward by spring force of the second spring 124, and the lock pin 121 is engaged with the second engagement groove 127 of the lock rod 105. In such a way, the unlocked state of the steering shaft 110 is held even after the electric steering lock apparatus 100 is cut off, and driving safety is ensured.

Moreover, when the person who carries the electronic key returns the ignition key cylinder from the engine start position to the OFF position in order to park the vehicle, the engine is stopped, and in addition, the lock rod 105 moves by the drive of the drive motor (not shown), and the electric steering lock apparatus 100 turns from the steering unlocked state of FIG. 2 to the steering locked state of FIG. 1.

In this steering locked state, when a person who aims to fraudulently unlock the electric steering lock apparatus 100 attacks the same from the outside, and an impact with the predetermined value or more is applied to the electric steering lock apparatus 100, the rod guide portion 103 and the lock rod 105 are cut off at the spots of the weak portions 106 and 107. Then, as shown in FIG. 4, the lock control member 123 moves upward by the spring force of the second spring 124, and the lock pin 121 is engaged with the first engagement groove 126 of the lock rod 105. In such a way, the locked state of the steering shaft 110 is held even after the electric steering lock apparatus 100 is cut off, and accordingly, the electric steering lock apparatus 100 is excellent in stealing prevention properties.

[Patent Document 1] Japanese Patent Laid-Open Publication No. 2004-231122

DISCLOSURE OF THE INVENTION

However, in the above-described conventional electric steering lock apparatus 100, in the case where the person who fraudulently unlocks the electric steering lock apparatus 100 concerned attacks the same, the rod guide portion 103 and the lock rod 105 are cut off, and the deadlock mechanism 120 is actuated, when a person who carries the electronic key thereafter rotates the ignition key cylinder, the drive motor (not shown) sometimes drives to positionally shift only an upper end side of the upper rod 105a of the lock rod 105. Even in such a case where only the upper end side concerned is positionally shifted, a control unit (not shown) recognizes that the lock rod 105 positionally shifts to the unlocked position. Hence, there is a problem that the start of the engine is permitted though the electric steering lock apparatus 100 is substantially in the steering locked state.

In this connection, it is an object of the present invention to provide an electric steering lock apparatus that prevents a malfunction that the engine is started in the case where the deadlock mechanism is actuated and the electric steering lock apparatus is in the steering locked state.

A first aspect of the invention of this application, which achieves the above-described object, is an electric steering lock apparatus, including: a start source that starts a drive device of a vehicle; an electric drive source disposed in a frame body covered with a cover; a rod guide portion protruded on the frame body; a guide-side weak portion formed on the rod guide portion; a lock rod disposed in the rod guide portion so as to be freely movable between a locked position and an unlocked position by drive of the electric drive source; a rod-side weak portion formed on the lock rod; and a deadlock mechanism that holds a rod tip end-side region located closer to a tip end side of the lock rod than the weak portion thereof at a position at a point of time when the lock rod is cut off when the rod guide portion and the lock rod are cut off at positions of the guide-side weak portion and the rod-side weak portion, wherein a rod base end-side region located closer to a base end side of the lock rod thereof than the rod-side weak portion is held at the locked position in a state where the deadlock mechanism is actuated, and the start source is disabled to be started in a state where the lock rod is located at the locked position.

In accordance with the invention of this application, in the case where the deadlock mechanism is actuated, and the electric steering lock apparatus turns substantially to the steering locked state, the lock rod is held at the locked position. Hence, there can be prevented the malfunction that the engine is started in the case where the deadlock mechanism is actuated, and the electric steering lock apparatus is in the steering locked state.

BEST MODE FOR CARRYING OUT THE INVENTION

A description will be made below of embodiments of the present invention based on the drawings.

Figure 1:
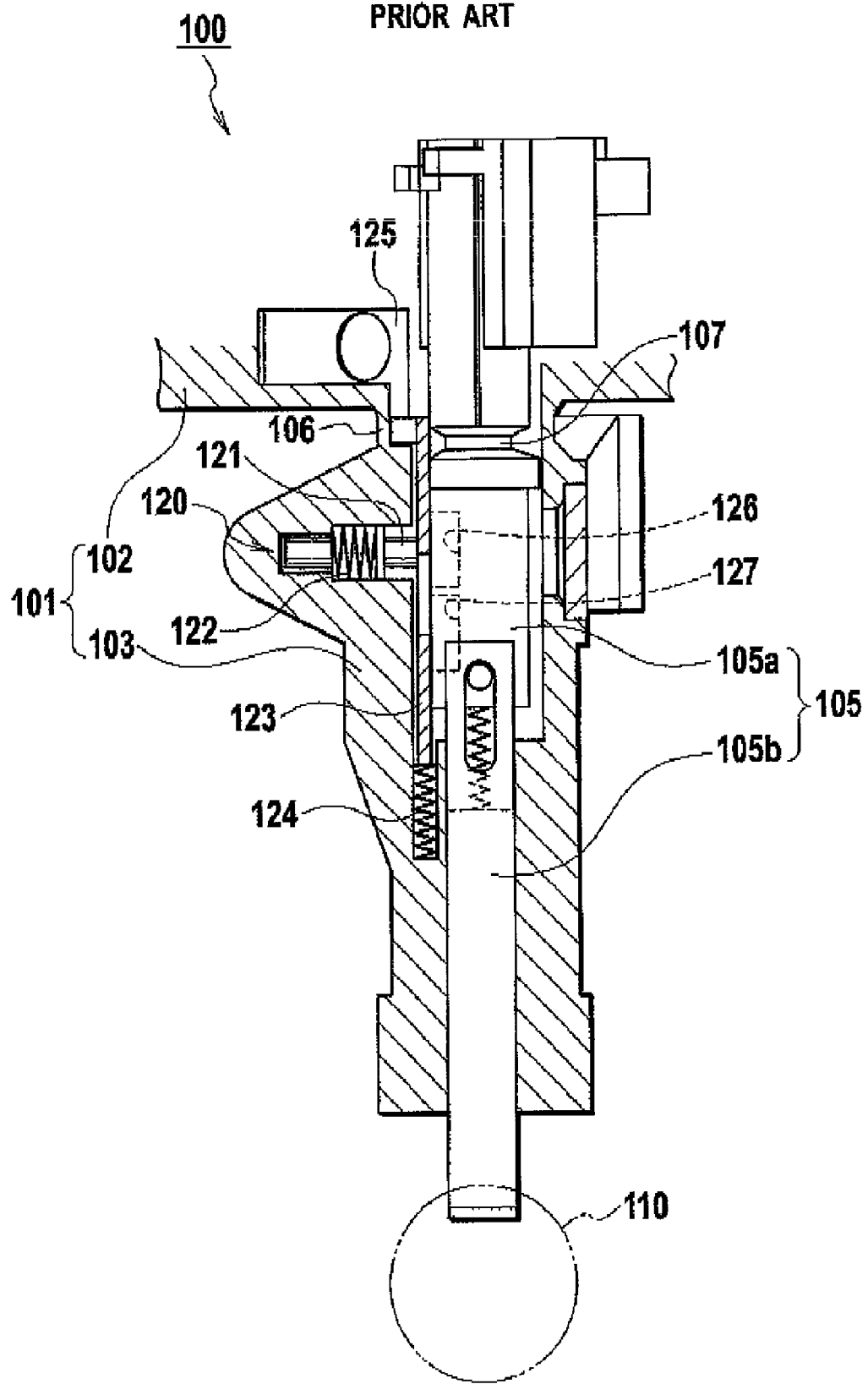
FIG. 1 is a cross-sectional view showing a steering locked state of a conventional electric steering lock apparatus.
Figure 2:
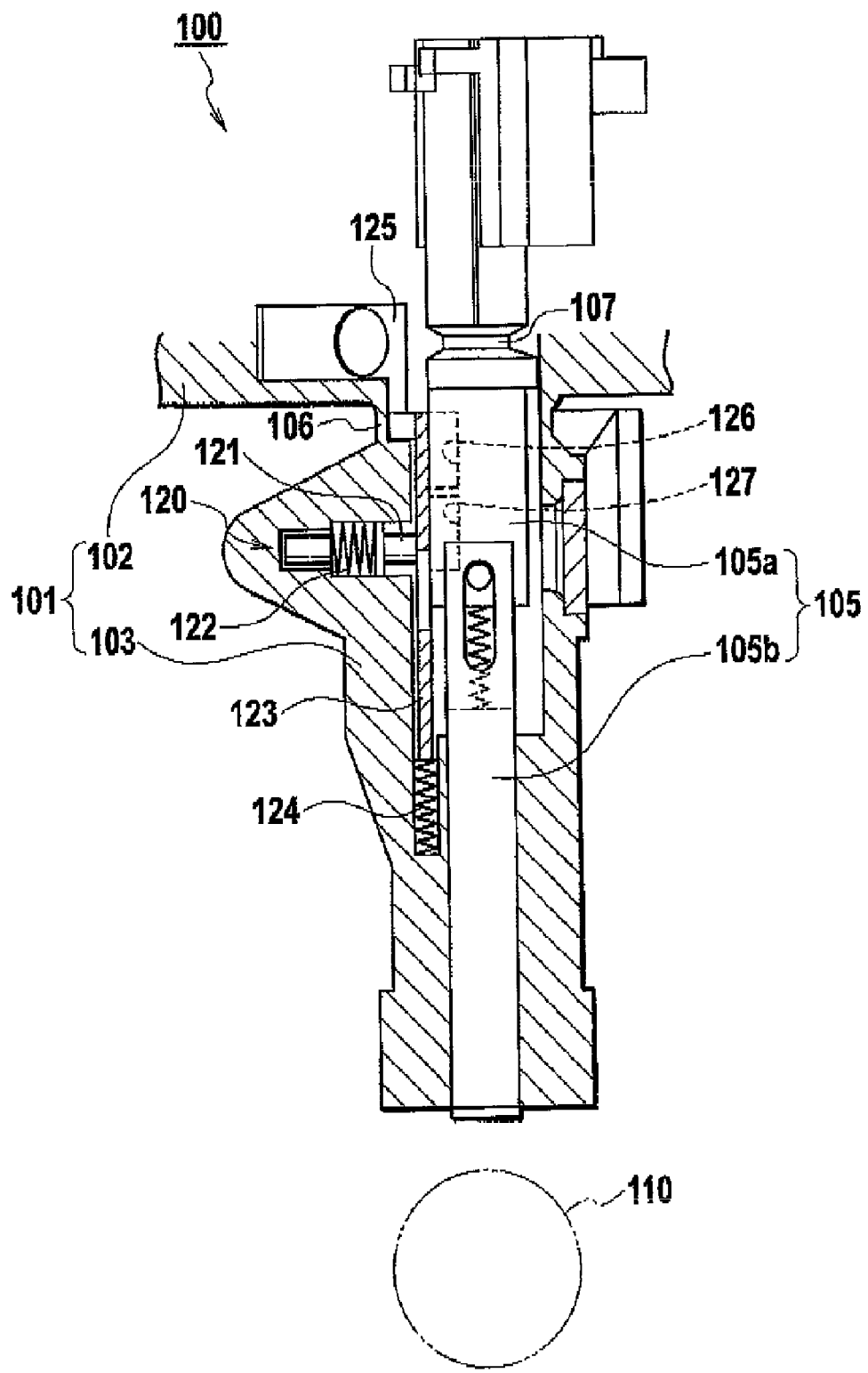
FIG. 2 is a cross-sectional view showing a steering unlocked state of the conventional electric steering lock apparatus.
Figure 3:
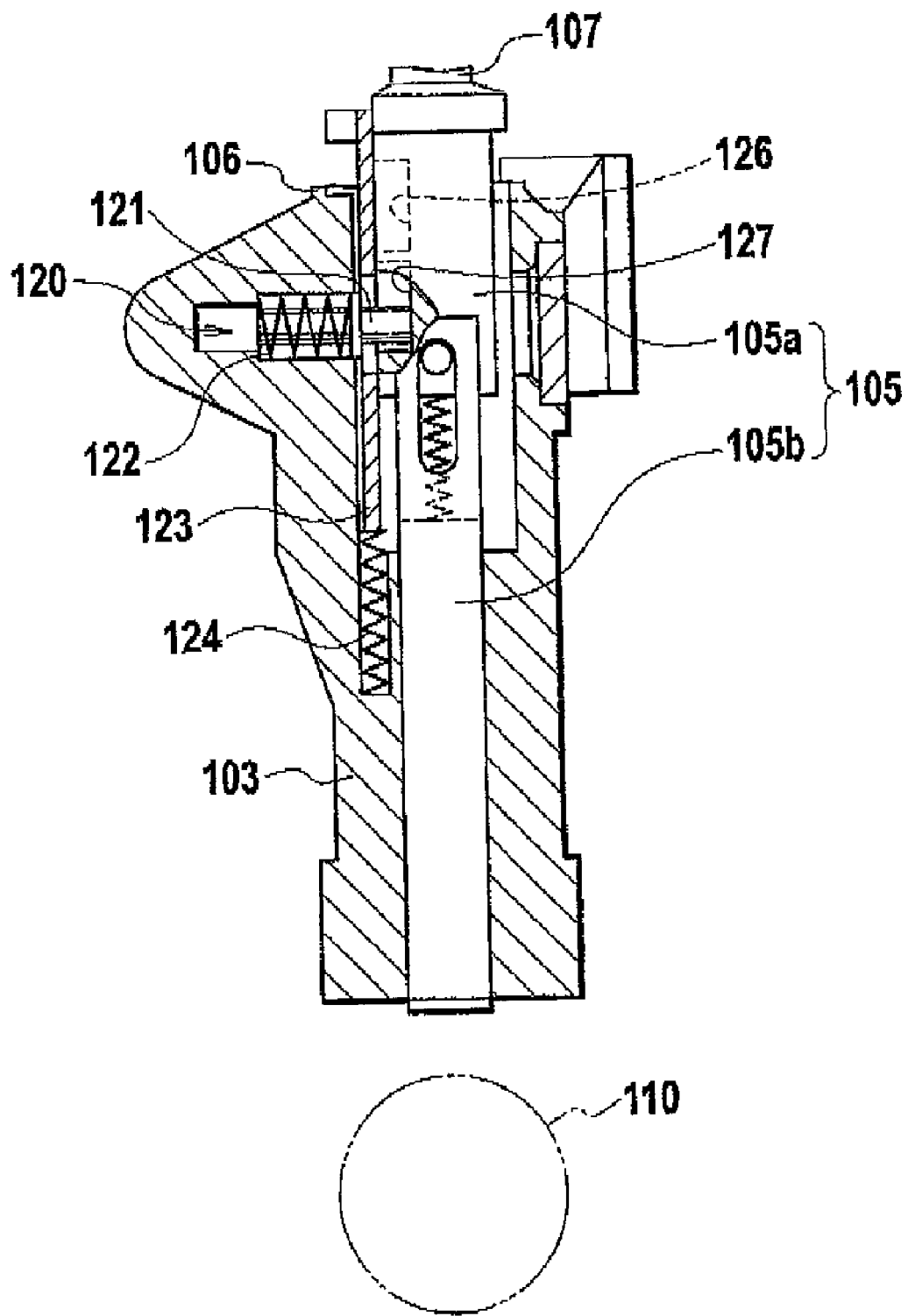
FIG. 3 is a cross-sectional view of the conventional electric steering lock apparatus when a deadlock mechanism is actuated in the steering unlocked state.
Figure 4:
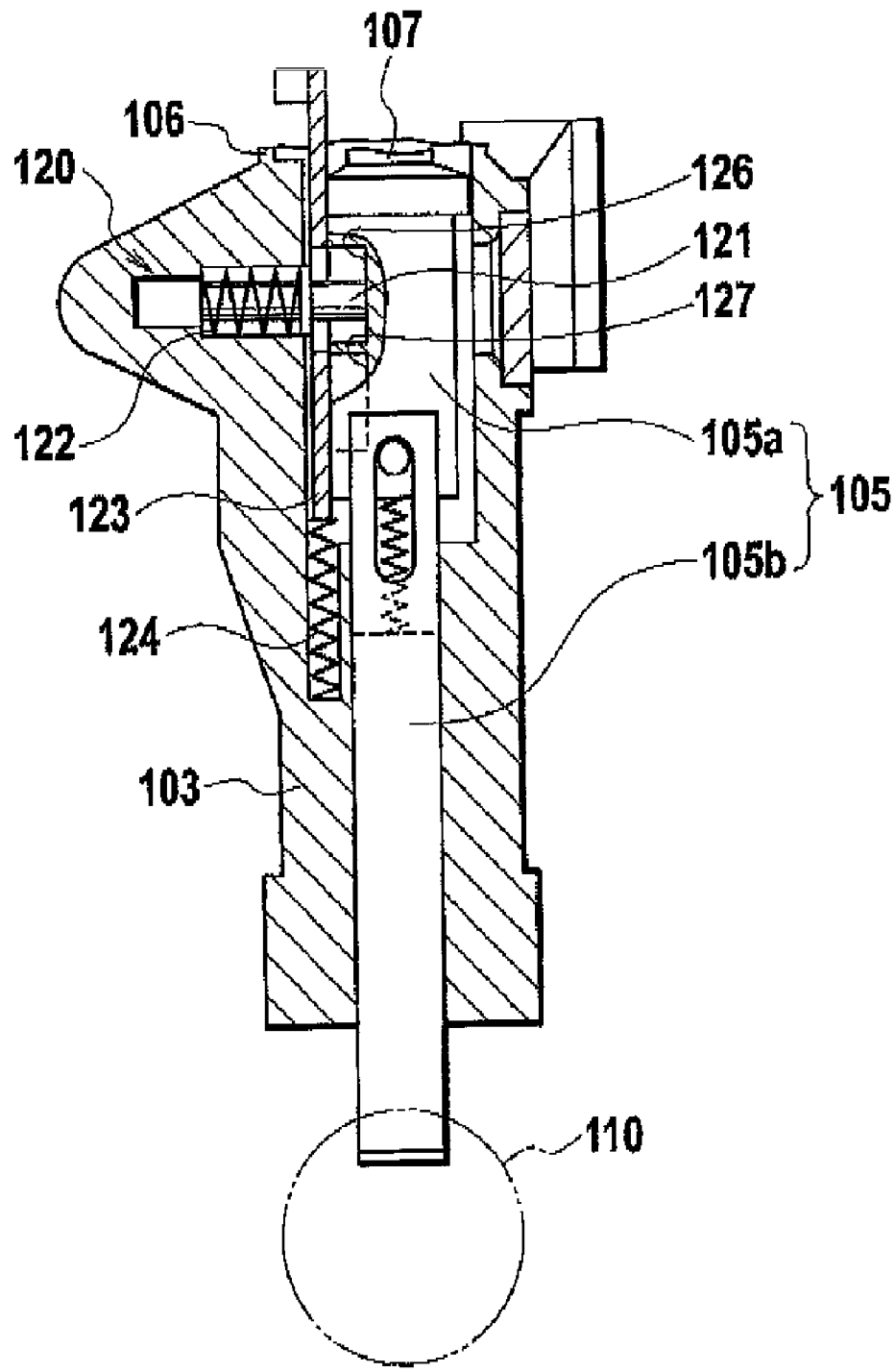
FIG. 4 is a cross-sectional view of the conventional electric steering lock apparatus when the deadlock mechanism is actuated in the steering locked state.
Figure 5:
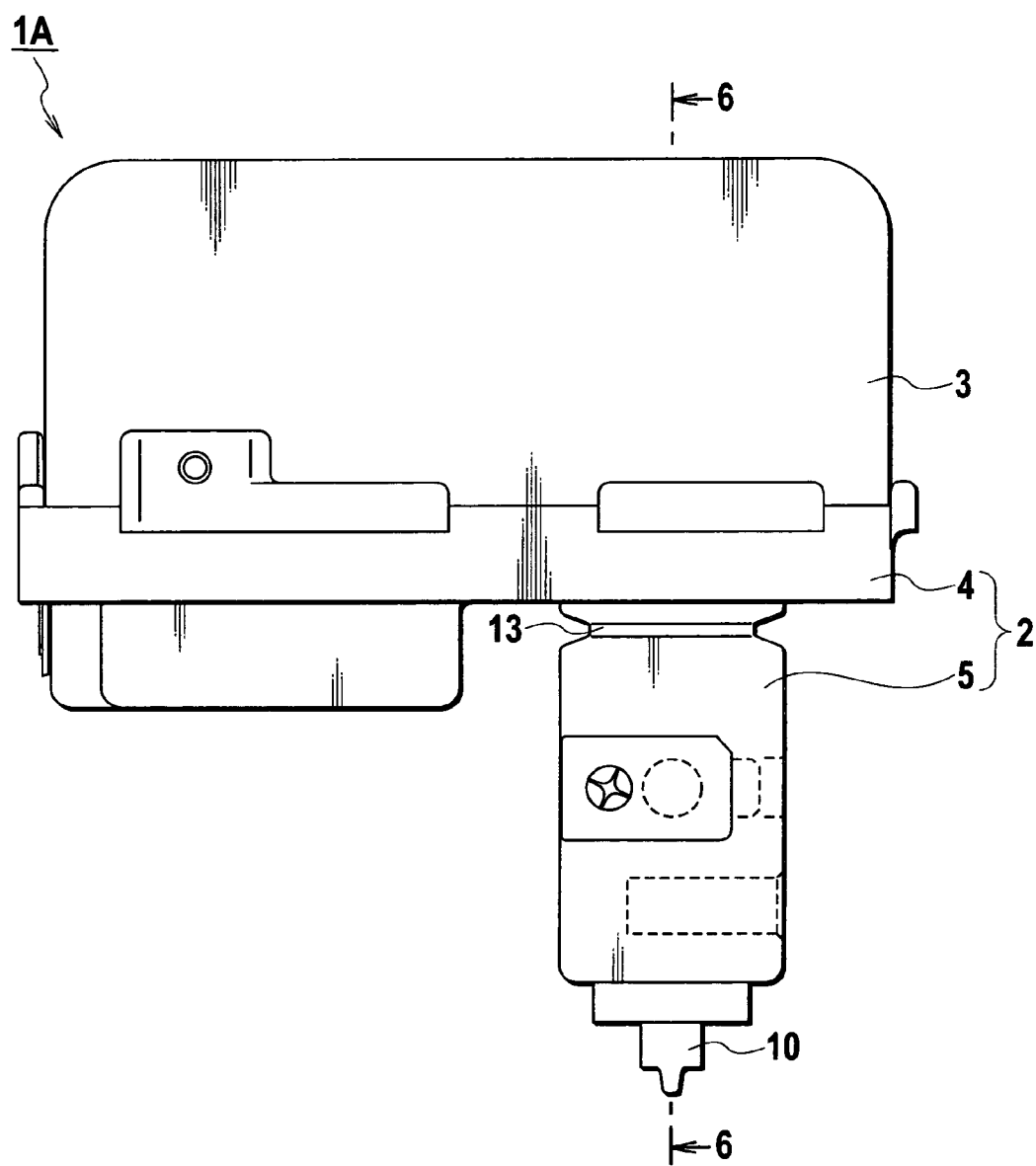
FIG. 5 is a front view of an electric steering lock apparatus, showing a first embodiment of the present invention.
Figure 6:
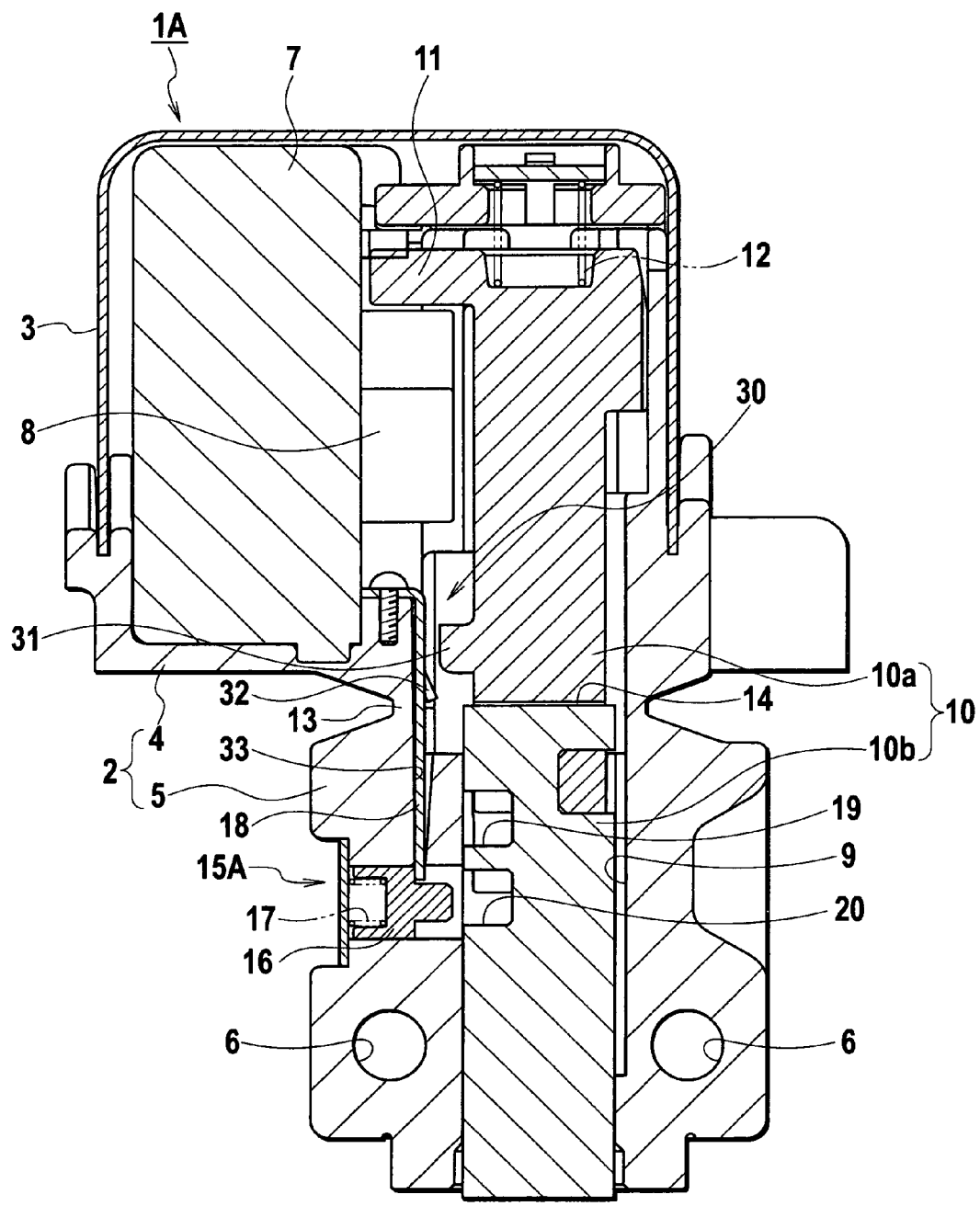
FIG. 6 is a cross-sectional view of the electric steering lock apparatus in the steering unlocked state along a line 6-6 of FIG. 5, showing the first embodiment of the present invention.
Figure 7:
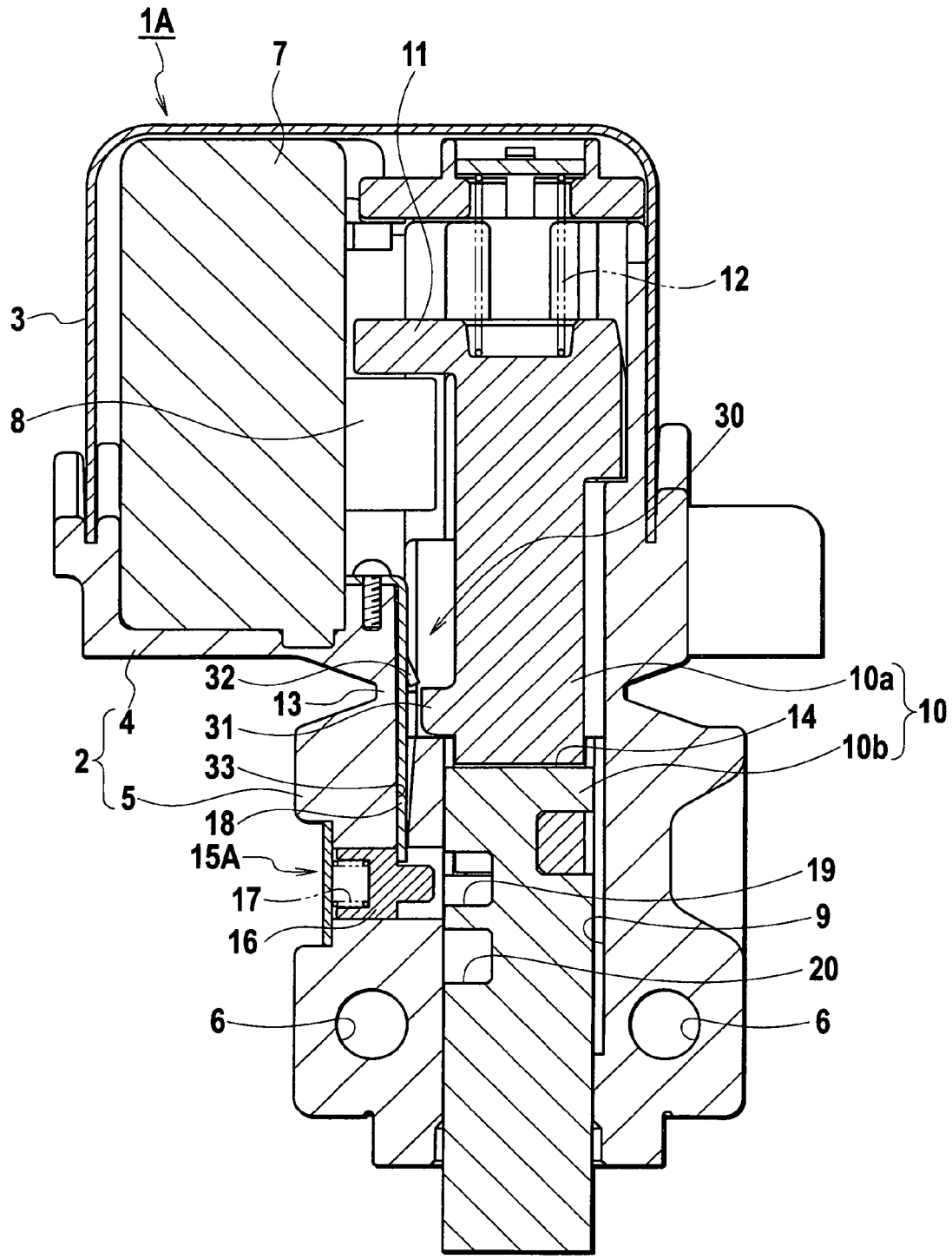
FIG. 7 is a cross-sectional view of the electric steering lock apparatus in the steering locked state along the line 6-6 of FIG. 5, showing the first embodiment of the present invention.

As shown in FIG. 5 to FIG. 7, an electric steering lock apparatus 1A includes a frame 2 and a cover 3 that covers an upper surface of this frame 2. The frame 2 includes a frame body 4 and a rod guide portion 5 protruded on a lower side of this frame body 4. In the rod guide portion 5, bolt insertion holes 6 for fixing the rod guide portion 5 to a vehicle body side are provided at two spots thereof.

On an upper surface of the frame body 4 covered with the cover 3, there are housed: an ignition key cylinder as a start switch that can be rotationally operated by a person who carries an electronic key; a motor unit 7 as an electric drive source controlled by the rotational operation for this ignition key cylinder; a cam member 8 that rotates by an output of this motor unit 7; and the like.

In the rod guide portion 5, a rod slide hole 9 is formed. One end side of this rod slide hole 9 is opened to the upper surface of the frame body 4 covered with the cover 3, and the other end side thereof is opened to the outside.

A lock rod 10 is composed of an upper rod portion 10a and a lower rod portion 10b coupled thereto, and is disposed in the rod slide hole 9 so as to be freely movable. A base end side of the upper rod portion 10a protrudes on the frame body 4. On an upper end of the upper rod portion 10a that protrudes on the frame body 4, a hanger portion 11 is provided integrally therewith. On an upper surface of the upper rod portion 10a, a spring 12 that urges the lock rod 10 to a locked position side is disposed, and by spring force of this spring 12, a lower surface of the hanger portion 11 is brought into pressure contact with the cam member 8. In such a way, the lock rod 10 moves following a cam surface of the cam member 8, and moves between a locked position (position of FIG. 7) where rotation of a steering shaft (not shown) is inhibited and an unlocked position (position of FIG. 6) where the rotation of the steering shaft (not shown) is permitted.

On a base end spot of the rod guide portion 5, and on a coupled spot of the upper rod portion 10a and lower rod portion 10b of the lock rod 10, a guide-side weak portion 13 and a rod-side weak portion 14, which are weaker in terms of strength than other spots, are provided. When external force with a predetermined value or more is applied to the rod guide portion 5 and the lock rod 10, both of the rod guide portion 5 and the lock rod 10 are cut off at spots of the guide-side weak portion 13 and the rod-side weak portion 14.

A deadlock mechanism 15A includes: a lock pin 16 disposed closer to a tip end side of the rod guide portion 5 than the guide-side weak portion 13 thereof; a first spring 17 that urges this lock pin 16 to a rod slide hole 9 side; a lock control member 18 that regulates movement of the lock pin 16 in a protruding direction; and first and second engagement grooves 19 and 20 formed on the lower rod portion 10b of the lock rod 10.

Note that, though a separate member from the frame body 4 is used as the lock control member 18 in this embodiment, the lock control member 18 may be formed integrally with the frame body 4.

When the rod guide portion 5 is cut off at the guide-side weak portion 13, the lock control member 18 comes not to regulate the lock pin 16 since the rod guide portion 5 becomes spaced from the frame body 4. The first engagement groove 19 is set at a position opposite to the lock pin 16 in the case where the lock rod 10 is located at the locked position. The second engagement groove 20 is set at a position opposite to the lock pin 16 in the case where the lock rod 10 is located at the unlocked position.

Figure 8:
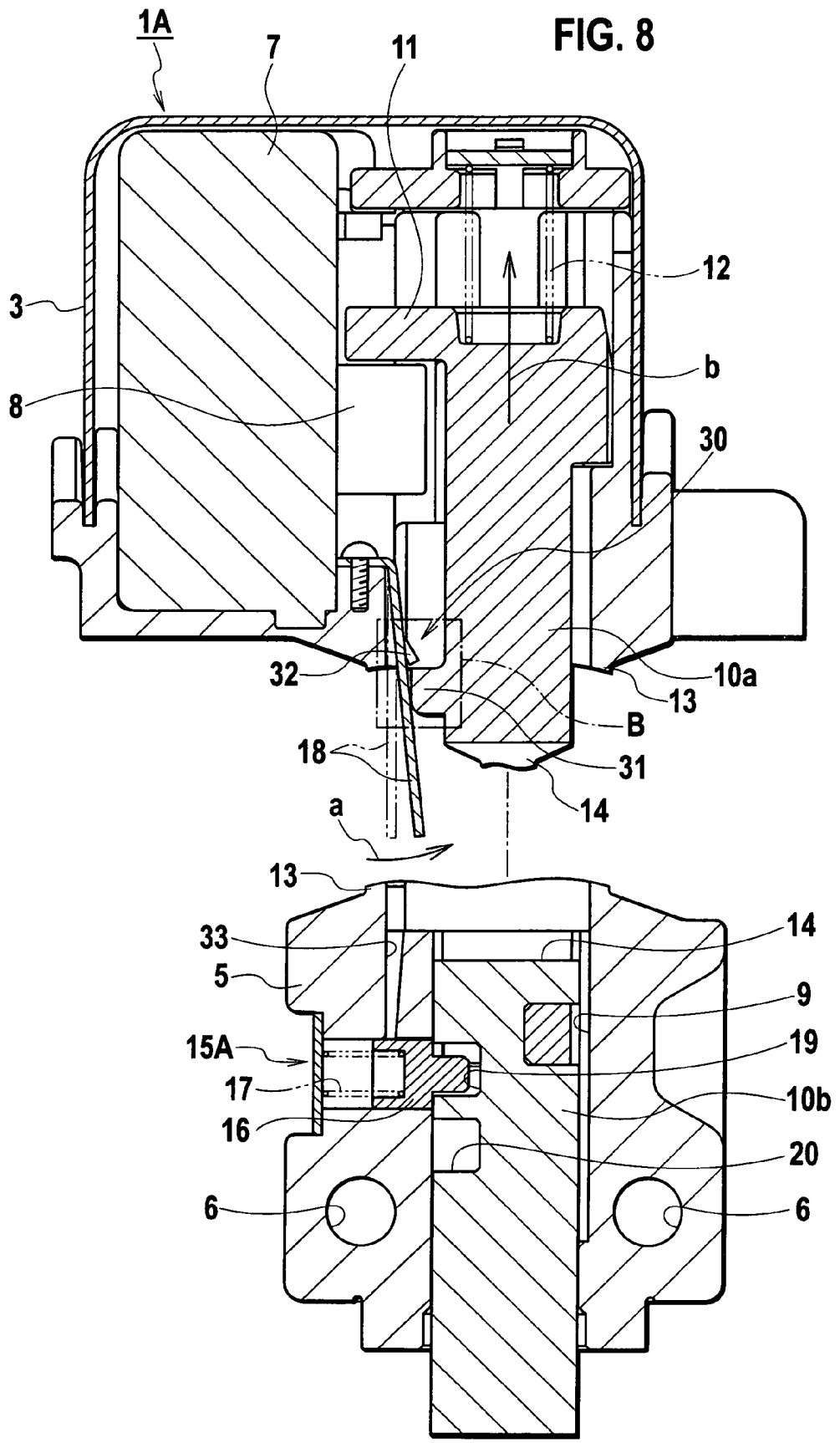
FIG. 8 is a cross-sectional view of the electric steering lock apparatus showing a state where the deadlock mechanism is actuated, showing the first embodiment of the present invention.

A locked position holding device 30 is composed of: the lock control member 18 of the deadlock mechanism 15A as a release inhibition member; and an engagement protrusion 31 as an engaged portion that is protruded closer to a base end side of the lock rod 10 than the rod-side weak portion 14 thereof. In order to serve as the release inhibition member, the lock control member 18 is formed of a spring material, and has an engagement hook 32 as an engagement portion provided thereon. Moreover, a lower end side of the lock control member 18 is inserted into a guide hole 33 of the rod guide portion 5 in a state where the lock control member 18 is flexurally deformed by using spring properties thereof. By the fact that the lock control member 18 is flexurally deformed, the engagement hook 32 of the lock control member 18 is located at a standby position where movement of the lock rod 10 is permitted. When the rod guide portion 5 is cut off at the spot of the guide-side weak portion 13, as shown in FIG. 8, the lower end side of the lock control member 18 is deformed so as to return from such flexure, and positionally shifts to a holding engagement position where the engagement hook 32 engages with the engagement protrusion 31 of the upper rod portion 10a of the lock rod 10.

In the above-described configuration, when the person who carries the electronic key rotates the ignition key cylinder (not shown) from an OFF position to an On position in order to run a vehicle, the lock rod 10 moves by drive of the motor unit 7, and moves from the locked position of FIG. 7 to the unlocked position of FIG. 6. Thereafter, when the ignition key cylinder is moved to an engine start position, information telling that such a steering lock is released is transmitted to a vehicle body-side control unit, and the engine as a drive device of the vehicle is started by a cell motor as a start source.

Note that the ignition key cylinder as the start switch includes a cylinder lock (not shown), and is composed so as to mechanically authenticate a passenger by a cylinder key (not shown) inserted into the cylinder lock and permit the rotation of the cylinder lock from the OFF position to the ON position when a state of emergency occurs where the electronic key does not function for some reason. Hence, in the case where such a state of emergency is not assumed, an ON/OFF type switch can be used as the start switch.

When an impact with a predetermined value or more is applied to the rod guide portion 5 and the lock rod 10 as a result of that the vehicle radically slows down during running thereof and the knees of a driver collide with the electric steering lock apparatus 1A in this case, the rod guide portion 5 and the lock rod 10 are cut off at the spots of the guide-side weak portion 13 and the rod-side weak portion 14, whereby an impact received by the driver is reduced.

Then, when the rod guide portion 5 and the lock rod 10 are cut off at the guide-side weak portion 13 and the rod-side weak portion 14, the lock control member 18 comes not to regulate the lock pin 16, and the lock pin 16 is engaged with the second engagement groove 20 of the lock rod 10. In such a way, even after the electric steering lock apparatus 1A is cut off, an unlocked state of the steering shaft (not shown) is held. The unlocked state of the steering shaft (not shown) is held, whereby a steering wheel can be freely steered while the vehicle is running, and driving safety is ensured.

When the person who carries the electronic key returns the ignition key cylinder from the engine start position to the OFF position in order to park the vehicle, the engine is stopped, and in addition, the lock rod 10 moves by the drive of the motor unit 7, and positionally shifts from the unlocked position of FIG. 6 to the locked position of FIG. 7.

In this steering locked state, when a person who aims to fraudulently unlocks the electric steering lock apparatus 1A attacks the same from the outside, and the impact with the predetermined value or more is applied to the rod guide portion 5 and the lock rod 10, the rod guide portion 5 and the lock rod 10 are cut off at the spots of the guide-side weak portion 13 and the rod-side weak portion 14. Then, as shown in FIG. 8, the lock control member 18 comes not to regulate the lock pin 16, and the lock pin 16 is engaged with the first engagement groove 19 of the lower rod portion 10b of the lock rod 10. In such a way, the locked state of the steering shaft (not shown) is held even after the electric steering lock apparatus 1A is cut off. Hence, even after the electric steering lock apparatus 1A is cut off by receiving the attack, the steering shaft cannot be rotated freely, and accordingly, the electric steering lock apparatus 1A is excellent in stealing prevention properties.

Figure 9:
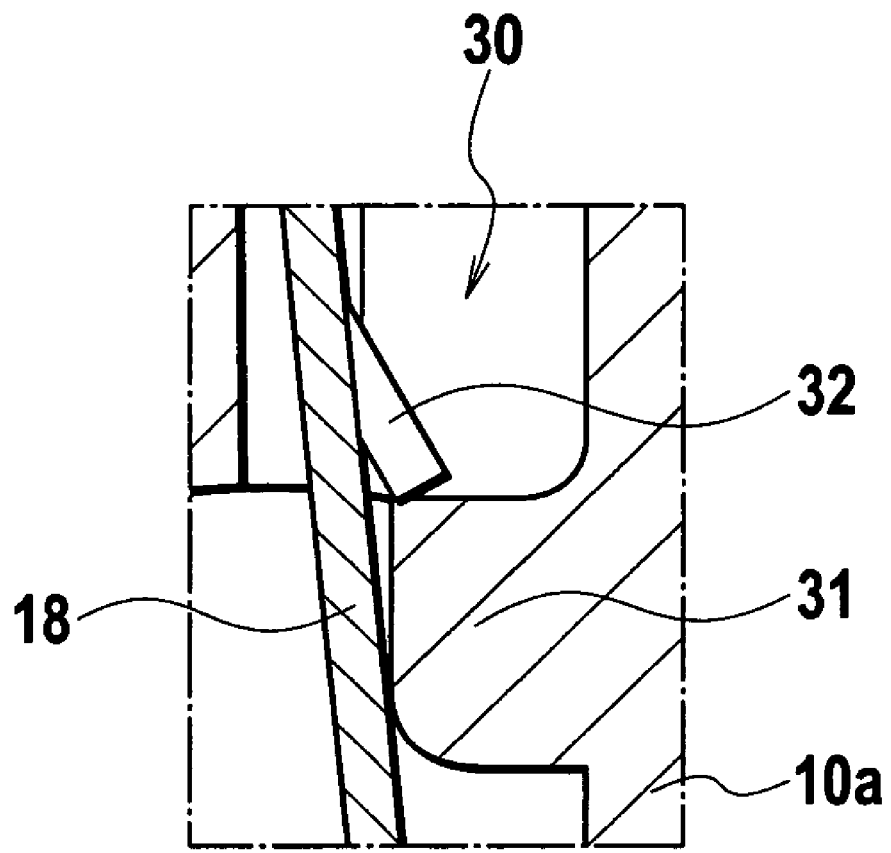
FIG. 9 is an enlarged view of a portion B of FIG. 8, showing the first embodiment of the present invention.

Moreover, when the rod guide portion 5 and the lock rod 10 are cut off at the spots of the guide-side weak portion 13 and the rod-side weak portion 14, the lower end side of the lock control member 18 is deformed so as to return from the flexure in an arrow a direction of FIG. 8. Then, as shown in FIG. 9 in detail, the engagement hook 32 of the lock control member 18 positionally shifts to the holding engagement position of engaging with the engagement protrusion 31 of the upper rod portion 10a of the lock rod 10.

After the electric steering lock apparatus 1A receives the above-described fraudulent attack, when the person who carries the electronic key rotates the ignition key cylinder from the OFF position to the ON position in order to run the vehicle, the control unit attempts to move the lock rod 10 in an unlocked direction b by the drive of the motor unit 7. However, the upper rod portion 10a of the lock rod 10 cannot move in the unlocked direction b since the movement of the engagement protrusion 31 thereof is inhibited by the engagement hook 32 of the lock control member 18. Since the control unit cannot move the lock rod 10 to the unlocked position as a result of trying the movement thereof by the drive of the motor unit 7 several times, the control unit determines that some failure has occurred in the electric steering lock apparatus 1A, and displays that the failure has occurred, and the like.

As described above, in the case where the deadlock mechanism 15A is actuated, and the electric steering lock apparatus 1A turns substantially to the steering locked state, the movement of the lock rod 10 to such an unlocked position side is inhibited by the locked position holding device 30. Hence, there can be prevented a malfunction that the engine is started in the case where the deadlock mechanism 15A is actuated, and the electric steering lock apparatus 1A is in the steering locked state.

In this first embodiment, as shown in FIG. 8, the locked position holding device 30 has a configuration of holding the upper rod portion 10a located closer to the base end side of the lock rod 10 than the rod-side weak portion 14 thereof at the position at the point of time when the lock rod 10 is cut off. Accordingly, the locked position holding device 30 can be composed of only mechanical parts, and therefore, it is not necessary to change a control system of the drive motor.

In this first embodiment, the mechanical locked position holding device 30 is composed of: the lock control member 18 that is supported on a frame body 4-side and has the engagement hook 32; and the engagement protrusion 31 provided on the upper rod portion 10a located closer to the base end side of the lock rod 10 than the rod-side weak portion 14 thereof. Moreover, the mechanical locked position holding device 30 is composed so that the lock control member 18 can be located, before the rod guide portion 5 is cut off, at the standby position where the movement of the lock rod 10 is permitted, and after the rod guide portion 5 is cut off, can positionally shift to the holding engagement position of engaging with the engagement protrusion 31 to thereby allow the upper rod portion 10a to be located at the locked position. Hence, the movement itself of the lock rod 10 is inhibited by the locked position holding device 30, and accordingly, the start of the engine can be inhibited without any design change of the control system of the drive motor.

In this first embodiment, the deadlock mechanism 15A is composed of: the lock pin 16 disposed closer to the tip end side of the rod guide portion 5 than the guide-side weak portion 13 thereof; and the lock control member 18 capable of controlling the movement of the lock pin 16. Moreover, the deadlock mechanism 15A is composed so that the lock control member 18 can inhibit the movement of the lock pin 16 to such a deadlock engagement position in the state before the rod guide portion 5 is cut off, and that, when the rod guide portion 5 is cut off at the guide-side weak portion 13, the lock control member 18 can release such regulation of the movement of the lock pin 16, and the lock pin 16 can hold a tip end side of the lock rod 10 at the locked position. Furthermore, the lock control member 18 of the deadlock mechanism 15A is composed so as to also serve as a holding member. Hence, the number of parts of the locked position holding device 30 can be reduced, resulting in simplification of the configuration. Note that, as a matter of course, the holding member may be composed of a member other than the lock control member 18 of the deadlock mechanism 15A.

In this first embodiment, the lock control member 18 as the release inhibition member is composed of the spring material, and has the engagement hook 32. The lock control member 18 is composed so that the engagement hook 32 can be located, before the rod guide portion 5 is cut off, at the standby position of permitting the movement of the lock rod 10 in such a manner that the lock control member 18 concerned is assembled to the rod guide portion 10 in the flexurally deformed state, and so that, when the rod guide portion 5 is cut off, the engagement hook 32 can positionally shift to the holding engagement position of inhibiting the movement of the lock rod 10 in such a manner that the lock control member 18 is deformed so as to return from the flexure. Hence, the number of part of the locked position holding device 30 can be reduced, resulting in the simplification of the configuration. Note that, as a matter of course, the release inhibition member may be composed of a member other than the lock control member 18.

Figure 10:
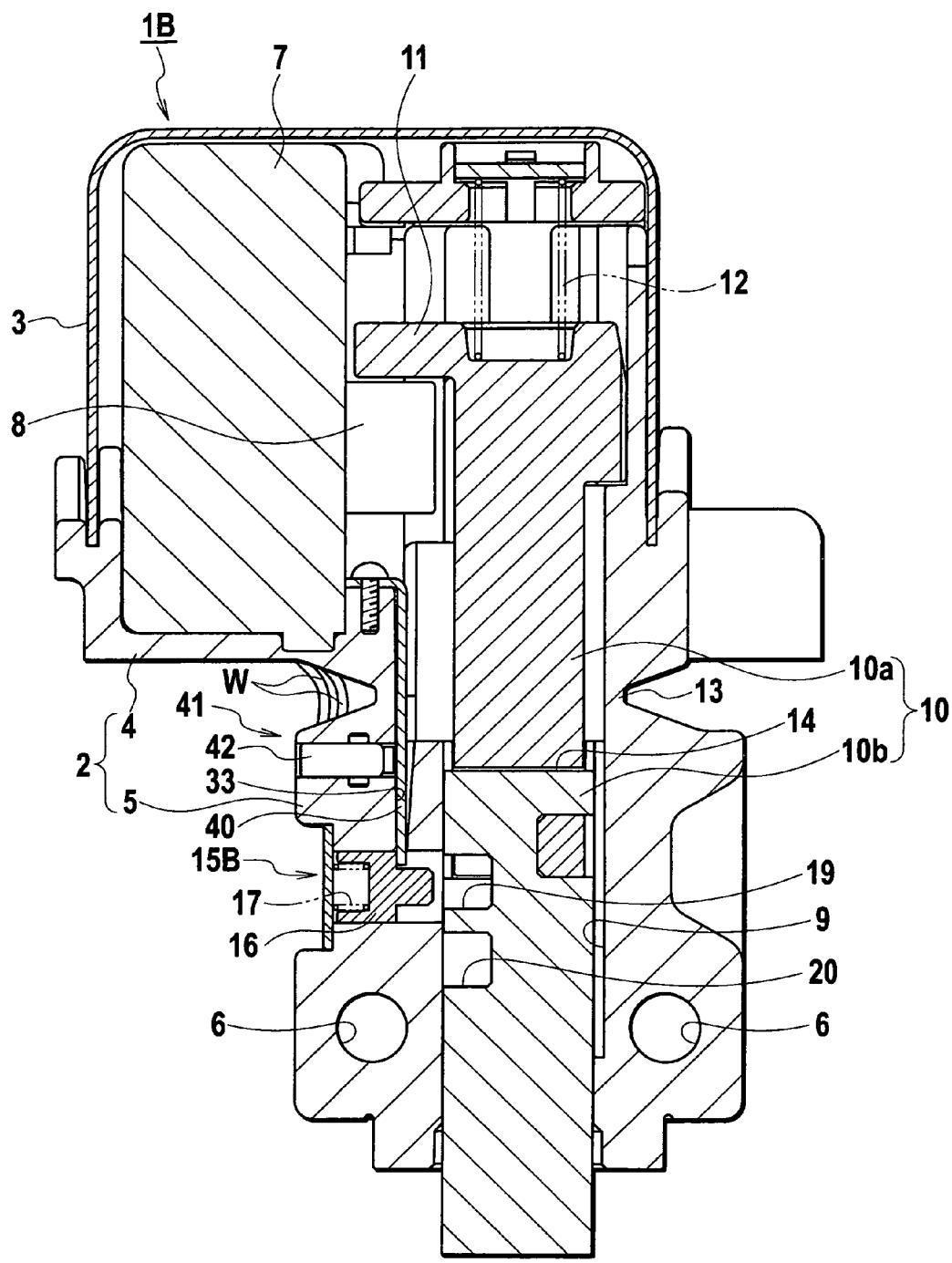
FIG. 10 is a cross-sectional view of an electric steering lock apparatus, showing a second embodiment of the present invention.
Figure 11:
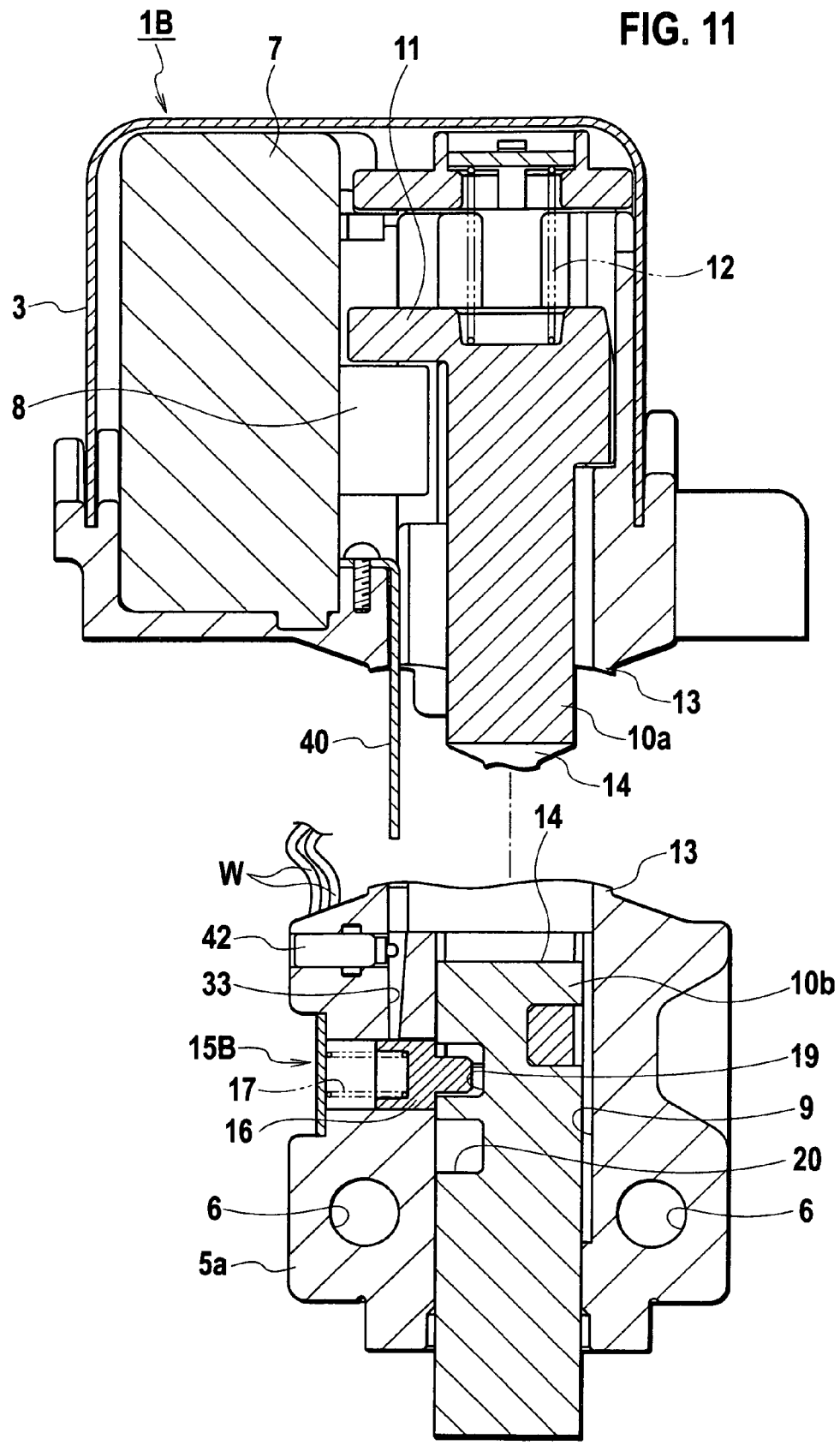
FIG. 11 is a cross-sectional view of the electric steering lock apparatus showing a state where a deadlock mechanism is actuated, showing the second embodiment of the present invention.
Figure 12:
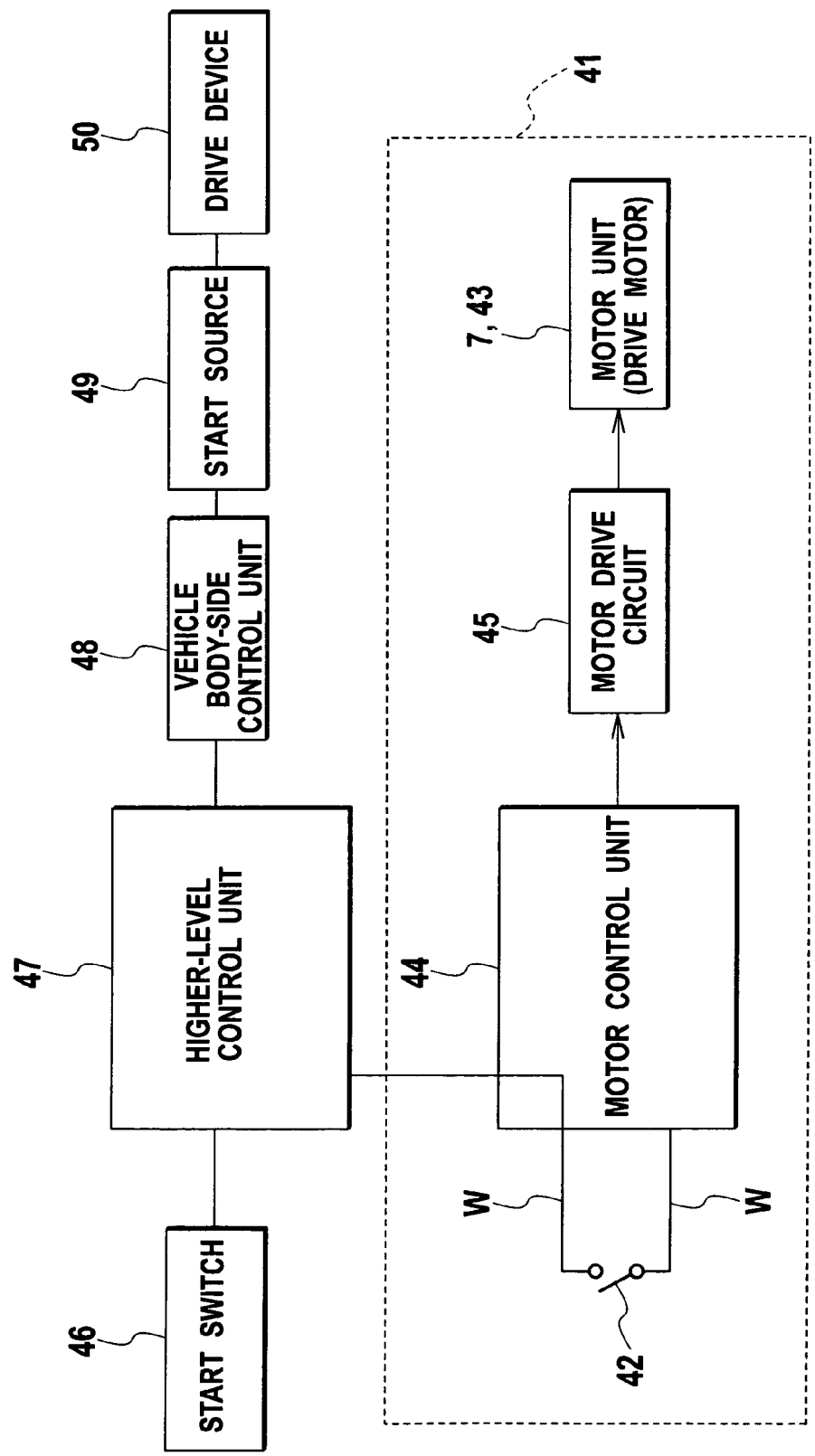
FIG. 12 is a schematic circuit block diagram of a control system of the electric steering lock apparatus, showing the second embodiment of the present invention.
Figure 13:
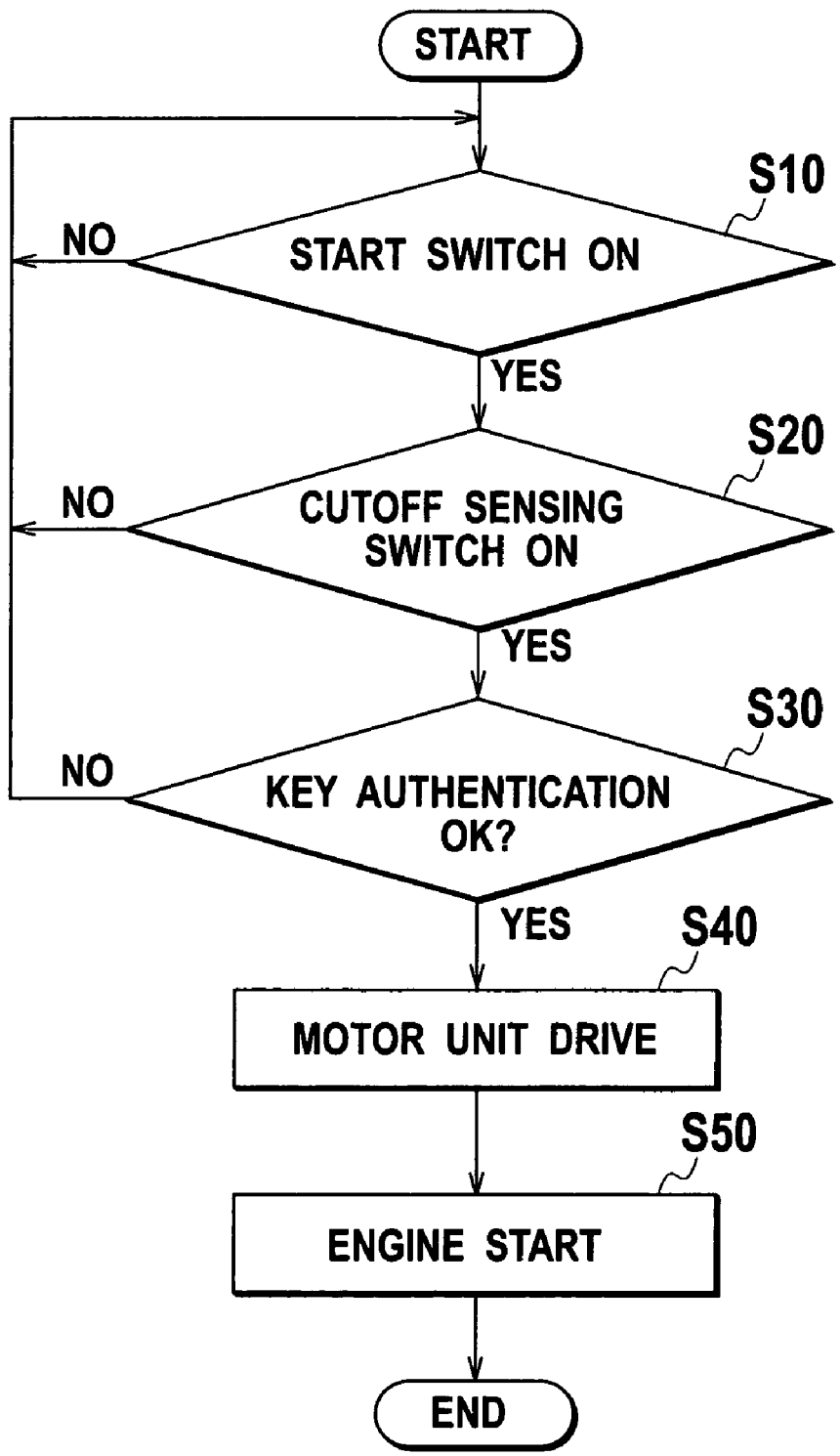
FIG. 13 is a flowchart showing an outline of a series of operations in the second embodiment of the present invention.

FIG. 10 to FIG. 12 show a second embodiment of the present invention, FIG. 10 is a cross-sectional view of an electric steering lock apparatus, FIG. 11 is a cross-sectional view of the electric steering lock apparatus in a state where a deadlock mechanism is actuated, FIG. 12 is a schematic circuit block diagram of a control system of the electric steering lock apparatus, and FIG. 13 is a flowchart showing an outline of a series of operations.

An electric steering lock apparatus 1B of this second embodiment is composed so that a locked position holding device 41 can inhibit the movement of the lock rod 10 to the unlocked position by using electrical means after a deadlock mechanism 5B is actuated. Hence, in comparison with the electric steering lock apparatus 1A of the first embodiment, a lock control member 40 of the deadlock mechanism 15B is composed of a mere plate material, and configurations other than the locked position holding device 41 are the same as those of the above-described first embodiment. In the drawings, the same reference numerals are assigned to the same constituent spots as those of the first embodiment, and a description thereof will be omitted.

Specifically, as shown in FIG. 10 to FIG. 12, the locked position holding device 41 includes: a cutoff sensing switch 42 as a cutoff sensing device that senses cutoff of the rod guide portion 5; and a motor control unit 44 that, when the cutoff sensing switch 42 outputs sensing of the cutoff as an electric signal, ignores a movement command for the motor unit 7, which is to move the lock rod 10 to the unlocked position side, and does not execute the drive of the motor unit 7.

The cutoff sensing switch 42 is housed closer to the tip end side of the rod guide portion 5 than the guide-side weak portion 13 thereof, and is composed so as to sense cutoffs of the rod guide portion 5 and the lock rod 10 based on whether or not the regulation of the lock control member 40 is released. Specifically, the cutoff sensing switch 42 is in an ON state by being pressed by the lock control member 40 in a state before the rod guide portion 5 is cut off, and when the rod guide portion 5 is cut off, the cutoff sensing switch 42 comes not to be pressed by the lock control member 40, and turns to an OFF state.

Electric wires W which connect the cutoff sensing switch 42 and the motor control unit 44 to each other are composed so as to be disconnected by the cutoff of the rod guide portion 5, and are composed, in a disconnected state, so as to output an output of the case where the cutoff sensing switch 42 senses the cutoff, that is, an OFF signal, to the motor control unit 44. Moreover, a configuration is adopted so that the above-described OFF signal can also be outputted to a higher-level control unit 47 that controls the entirety of the electric steering lock apparatus 1B.

The motor control unit 44 controls a motor drive circuit 45 to drive the motor unit 7 in forward and reverse directions.

The higher-level control unit 47 connects to an ignition key cylinder 46 as a start switch, the motor control unit 44 and a vehicle body-side control unit 48, the vehicle body-side control unit 48 connects to a vehicle body-side control unit 49 as a start source, and the vehicle body-side control unit 49 connects to a vehicle body-side control unit 50 as a drive device for the vehicle.

By using a flowchart of FIG. 9, a description will be made of a brief serial flow until the vehicle body-side control unit 50 of the vehicle in the steering locked state becomes concerned in the above-described configuration. When the person who carries the electronic key rotates the ignition key cylinder 46 from the OFF position to the ON position in order to run the vehicle, an ON signal is outputted from the ignition key cylinder 46 to the higher-level control unit 47 (Step S10). Next, based on the output of the cutoff sensing switch 42, the higher-level control unit 47 confirms that the frame 2 is not cut off (Step S20). Next, the higher-level control unit 47 communicates with the carried electronic key, performs an ID authentication therefor, and confirms that the electronic key is a correct electronic key (Step S30). Then, the lock rod 10 is positionally shifted from the locked position of FIG. 6 to the unlocked position (not shown) by the drive of the motor unit 7 (Step S40). Thereafter, when the ignition key cylinder 46 is moved to the engine start position, information telling that the steering lock is released is transmitted to the vehicle body-side control unit 48, and the vehicle body-side control unit 48 outputs a start command to the start source 49, and the start source 49 starts the drive device 50 (Step S50).

Moreover, in the steering locked state, when the person who aims to fraudulently unlock the electric steering lock apparatus 1B attacks the same from the outside, and the impact with the predetermined value or more is applied to the frame 2, the rod guide portion 5 and the lock rod 10 are cut off at the spots of the guide-side weak portion 13 and the rod-side weak portion 14. Then, as shown in FIG. 11, the lock control member 40 comes not to regulate the lock pin 16, and the lock pin 16 is engaged with the first engagement groove 19 of the lock rod 10. In such a way, the locked state of the steering shaft (not shown) is held even after the electric steering lock apparatus 1B is cut off, and accordingly, the electric steering lock apparatus 1B is excellent in stealing prevention properties.

Moreover, when the rod guide portion 5 and the lock rod 10 are cut off at the spots of the guide-side weak portion 13 and the rod-side weak portion 14, the lock control member 40 comes not to press the cutoff sensing switch 42, and the cutoff sensing switch 42 outputs the OFF signal to the motor control unit 44.

After the electric steering lock apparatus 1B receives the fraudulent attack as described above, when the person who carries the electronic key rotates the ignition key cylinder from the OFF position to the ON position in order to run the vehicle, the command to move the lock rod 10 to the unlocked position is outputted to the motor control unit 44. However, the motor control unit 44 ignores such a movement command, and does not drive the motor unit 7. Every time when the command to move the lock rod 10 to the unlocked position is inputted to the motor control unit 44 several times as a result of that the person who carries the electronic key repeats the rotational operation of the ignition key cylinder 46 several times, the motor control unit 44 ignores the command concerned. When the motor control unit 44 ignores the command repeatedly several times, the motor control unit 44 displays that the failure has occurred in order to allow the driver to recognize the failure concerned.

As described above, in the case where the deadlock mechanism 15B is actuated, and the electric steering lock apparatus 1B turns substantially to the steering locked state, the movement of the lock rod 10 to the unlocked position side is inhibited by the locked position holding device 41. Hence, there can be prevented a malfunction that the engine is started in the case where the deadlock mechanism 15B is actuated, and the electric steering lock apparatus 1B is in the steering locked state.

In this second embodiment, the locked position holding device 41 includes: the cutoff sensing switch 42 that senses the cutoff of the rod guide portion 5; and the motor control unit 44 that, when the cutoff sensing switch 42 outputs the sensing of the cutoff as the electric signal, ignores the command for the motor unit 7, which is to move the lock rod 10 to the unlocked position side, and does not execute the drive of the motor unit 7. Accordingly, the start of the engine can be regulated by only adding the cutoff sensing switch 42 and changing control software for a drive motor 43.

In this second embodiment, the cutoff sensing device is composed of the cutoff sensing switch 42, and accordingly, can be fabricated at low cost. Note that, as a matter of course, the cutoff sensing device may be composed of means other than the switch, for example, a sensor such as an object sensing sensor and a proximity sensor.

In this second embodiment, the cutoff sensing switch 42 is composed so as to be turned on/off by the lock control member 40. Hence, what is necessary is only to add the cutoff sensing switch 42, and accordingly, it is easy to make the design change, and low cost fabrication is possible. Note that, as a matter of course, the cutoff sensing switch 42 may be composed so as to be turned on/off by a member other than the lock control unit 40.

In this second embodiment, the electric wires W which connect the motor control unit 44 and the cutoff sensing switch 42 to each other are composed so as to be disconnected by the cutoff of the rod guide portion 5, and are composed, in the disconnected state, so as to output the same signal as such a cutoff sensing signal of the cutoff sensing switch 42. Hence, such disconnection of the electric wires W which connect the motor control unit 44 and the cutoff sensing switch 42 to each other also functions as a type of the cutoff sensing device. Accordingly, even in the case where the cutoff sensing switch 42 is not actuated normally at the time when the cutoff occurs, the actuation of the deadlock mechanism 15B can be surely sensed.

Note that, though the lock rod 10 is composed of two parts, which are the upper rod portion 10a and the lower rod portion 10b which are coupled to each other in the first and second embodiments, it is a matter of course that the lock rod 10 may be composed of a single part that has the rod-side weak portion 14.

The invention claimed is:

1. An electric steering lock apparatus, comprising:
a start source that starts a drive device of a vehicle;
an electric drive source disposed in a frame body covered with a cover;
a rod guide portion protruded on the frame body; a guide-side weak portion formed on the rod guide portion;
a lock rod disposed in the rod guide portion so as to be freely movable between a locked position and an unlocked position by drive of the electric drive source;
a rod-side weak portion formed on the lock rod; and a deadlock mechanism that holds a rod tip end-side region located closer to a tip end side of the lock rod than the weak portion thereof at a position at a point of time when the lock rod is cut off when the rod guide portion and the lock rod are cut off at positions of the guide-side weak portion and the rod-side weak portion,
wherein a rod base end-side region located closer to a base end side of the lock rod than the rod-side weak portion thereof is held at the locked position in a state where the deadlock mechanism is actuated, and the start source is disabled to be started in a state where the lock rod is located at the locked position, and
a locked position holding device composed of the rod base end-side region and the frame body,
wherein the rod base end-side region of the rod is held at the locked position by engaging the rod base end-side region and the frame body with each other.

2. The electric steering lock apparatus according to claim 1, wherein the locked position holding device includes:
a holding member supported on the frame body side, the holding member having an engagement portion; and
an engaged portion provided on the rod base end-side region,
wherein the holding member is located, in a state where the rod guide portion is not cut off, at a standby position of permitting movement of the lock rod, and in a state where the rod guide portion is cut off, positionally shifts to a holding engagement position where the engagement portion and the engaged portion engage with each other, and
wherein the lock position holding device is composed so as to engage the rod base end-side region and the frame body with each other while interposing the engagement portion therebetween.

3. The electric steering lock apparatus according to claim 2, wherein the deadlock mechanism includes:
a lock recessed portion disposed on either one of the rod tip end-side region and the rod guide portion;
a lock pin that is provided on the other of the rod tip end-side region and the rod guide portion, is disposed to be urged toward the lock recessed portion, and is formed so as to be engageable with the lock recessed portion; and
a lock control member that, in a state where the rod guide portion and the lock rod are not cut off at the guide-side weak portion and the rod-side weak portion, inhibits movement of the lock pin to a deadlock engagement position where the lock recessed portion and the lock pin engage with each other, and in a state where the rod guide portion and the lock rod are cut off at the guide-side weak portion and the rod-side weak portion, releases regulation of the movement of the lock pin to the deadlock engagement position, wherein the lock control member of the deadlock mechanism is composed so as to also serve as the holding member.

4. The electric steering lock apparatus according to claim 3, wherein the lock control member is composed of a spring material having the engagement portion, wherein in the state where the rod guide portion and the lock rod are not cut off at the guide-side weak portion and the rod-side weak portion, the lock control member is located at the standby position by being assembled to the rod guide portion in a flexurally deformed state, and wherein in the state where the rod guide portion and the lock rod are cut off at the guide-side weak portion and the rod-side weak portion, the lock control member is composed so as to positionally shift to the holding engagement position.

5. An electric steering lock apparatus, comprising:

a start source that starts a drive device of a vehicle;

an electric drive source disposed in a frame body covered with a cover;

a rod guide portion protruded on the frame body;

a guide-side weak portion formed on the rod guide portion;

a lock rod disposed in the rod guide portion so as to be freely movable between a locked position and an unlocked position by drive of the electric drive source;

a rod-side weak portion formed on the lock rod; and a deadlock mechanism that holds a rod tip end-side region located closer to a tip end side of the lock rod than the weak portion thereof at a position at a point of time when the lock rod is cut off when the rod guide portion and the lock rod are cut off at positions of the guide-side weak portion and the rod-side weak portion, wherein a rod base end-side region located closer to a base end side of the lock rod than the rod-side weak portion thereof is held at the locked position in a state where the deadlock mechanism is actuated, and the start source is disabled to be started in a state where the lock rod is located at the locked position, and a locked position holding device including a cutoff sensing device that senses cutoff of the rod guide portion, and a control unit that controls the electric drive source, wherein, in a case where sensing of the cutoff is inputted from the cutoff sensing device, and a movement command to move the lock rod from a locked position side to an unlocked position side is inputted to the control unit, the control unit does not execute the movement command, and thereby holds the rod base end-side region of the rod at the locked position.

6. The electric steering lock apparatus according to claim 5, wherein the cutoff sensing device is composed of a cutoff sensing switch.

7. The electric steering lock apparatus according to claim 6, wherein the cutoff sensing switch is composed so as to be turned on/off by the lock control member.

8. The electric steering lock apparatus according to claim 5, wherein an electric wire that electrically connects the control unit and the cutoff sensing device to each other is composed so as to be disconnected by the cutoff of the rod guide portion, and is composed, in a disconnected state, so as to output a same signal as a cut off sensing signal of the cutoff sensing device to the control unit.

* * * * *